No. 798,927. PATENTED SEPT. 5, 1905.
J. J. SCHWOB.
ELEVATOR.
APPLICATION FILED DEC. 27, 1904.
3 SHEETS—SHEET 1.
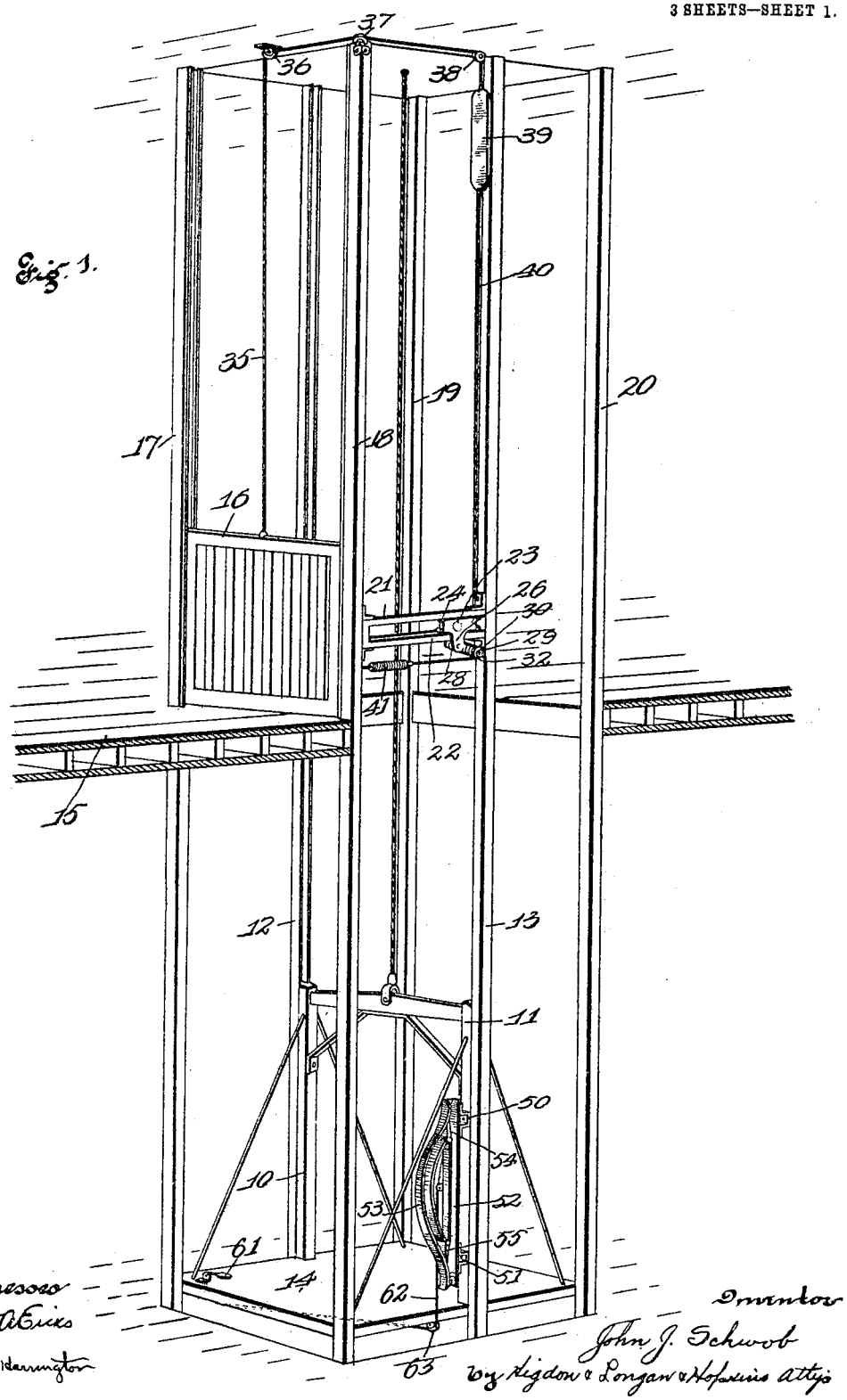

No. 798,927. PATENTED SEPT. 5, 1905.
J. J. SCHWOB.
ELEVATOR.
APPLICATION FILED DEC. 27, 1904.
3 SHEETS—SHEET 2.
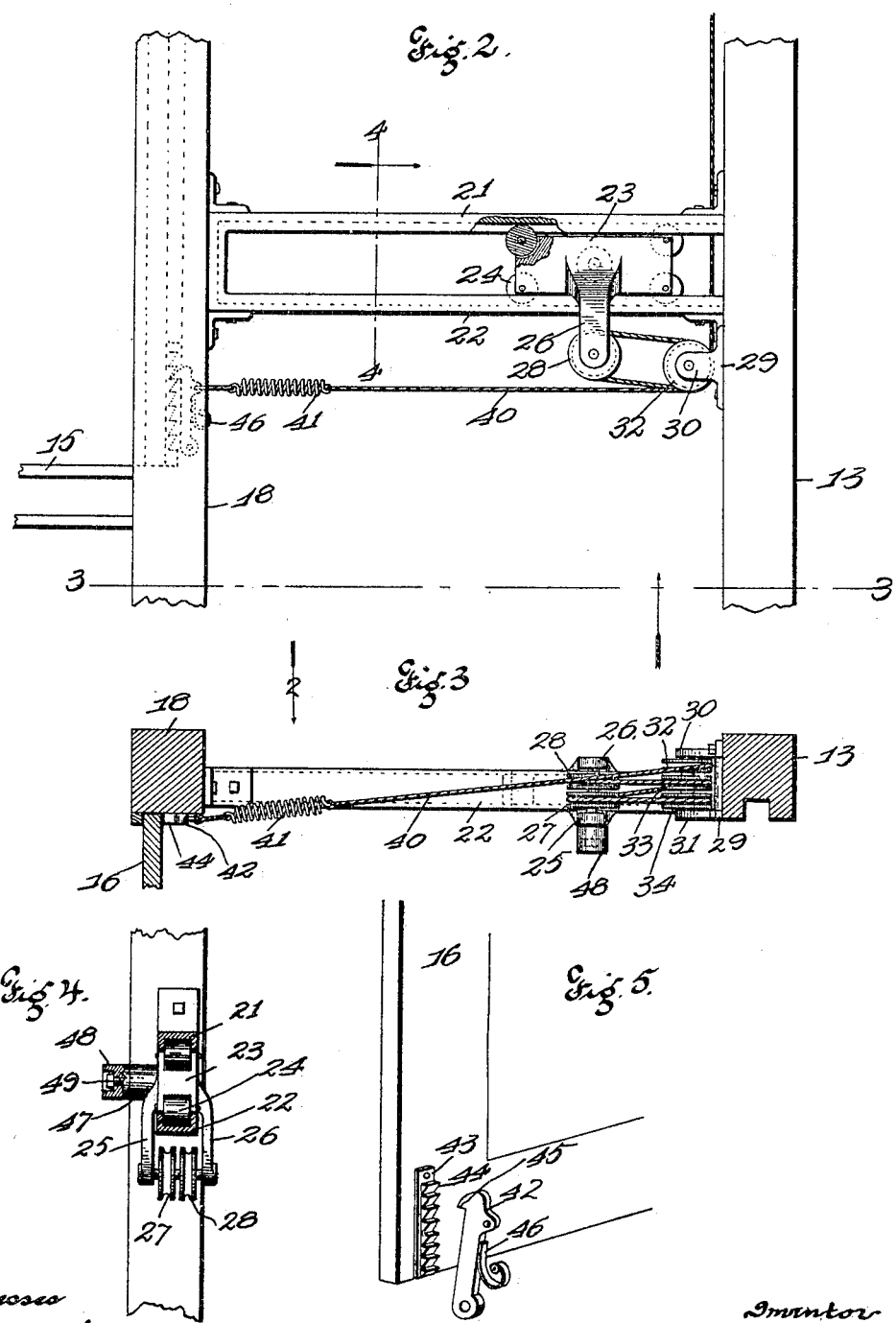

No. 798,927. PATENTED SEPT. 5, 1905.
J. J. SCHWOB.
ELEVATOR.
APPLICATION FILED DEC. 27, 1904.
3 SHEETS—SHEET 3.
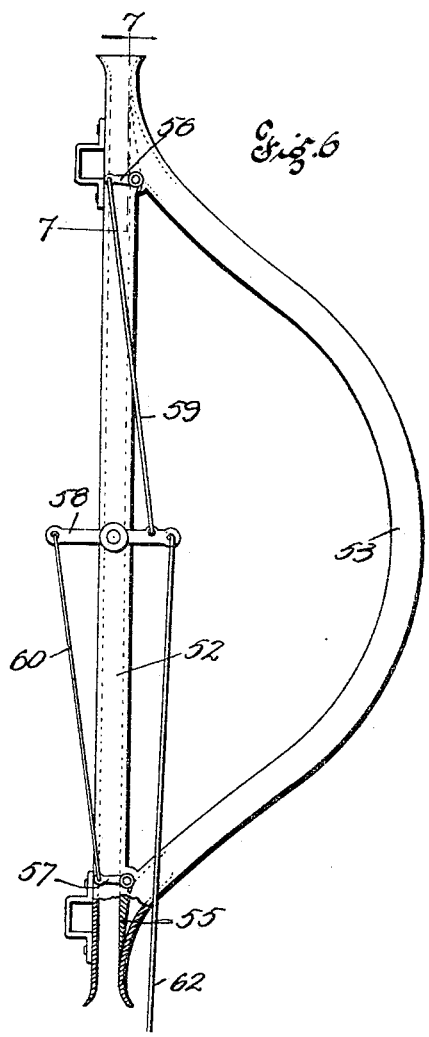
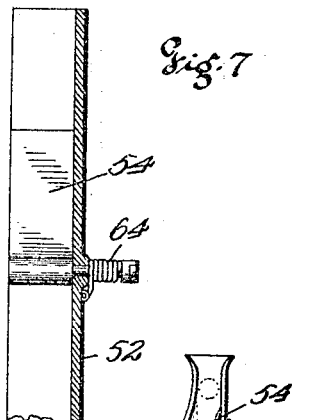
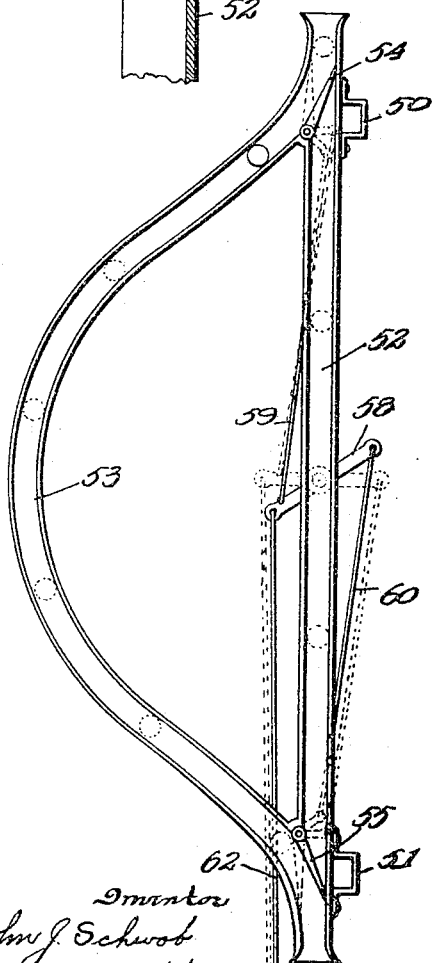
Witnesses
Inventor
John J. Schwob

UNITED STATES PATENT OFFICE.

JOHN J. SCHWOB, OF ST. LOUIS, MISSOURI.

ELEVATOR.

No. 798,927.     Specification of Letters Patent.     Patented Sept. 5, 1905.

Application filed December 27, 1904. Serial No. 238,286.

*To all whom it may concern:*

Be it known that I, JOHN J. SCHWOB, a citizen of the United States, and a resident of St. Louis, Missouri, have invented certain new and useful Improvements in Elevators, of which the following is a specification containing a full, clear, and exact description, reference being had to the accompanying drawings, forming a part hereof.

My invention relates to improvements in elevators; and it consists of the novel features herein shown, described, and claimed.

In the drawings, Figure 1 is a perspective of an elevator-platform and elevator-shaft embodying the principles of my invention. Fig. 2 is an enlarged detail elevation of the draft mechanism as seen looking in the direction indicated by the arrow 2 in Fig. 3. Fig. 3 is a horizontal section on the line 3 3 of Fig. 2 and looking upwardly, as indicated by the arrow. Fig. 4 is a cross-section on the line 4 4 of Fig. 2 and looking in the direction indicated by the arrow. Fig. 5 is a perspective illustrating the gate-latch. Fig. 6 is an inside elevation of the draft-operating mechanism upon an enlarged scale. Fig. 7 is an enlarged sectional detail on the line 7 7 of Fig. 6. Fig. 8 is an outside elevation of the draft-operating mechanism, said view being the reverse of Fig. 6.

Referring to the drawings in detail, the elevator-posts 10 and 11 travel up and down in the channel-bars 12 and 13 and carry the platform 14. Above the floor 15 the gate 16 is mounted to slide up and down in guideways at the corner-posts 17 and 18, said corner-posts forming the front corners of the elevator-shaft and the posts 19 and 20 forming the rear corners of the elevator-shaft and the platform 14 fitting between the corner-posts 17, 18, 19, and 20. An upper channel-bar 21 is mounted between the post 18 and the channel-bar 13, and the lower channel-bar 22 is mounted below and parallel with the upper channel-bar. The channels of the bars 21 and 22 are toward each other. The draft-block 23 is mounted between the channel-bars 21 and 22, there being a roller 24 at each corner of the draft-block, said rollers fitting in the channels of the bars 21 and 22, so that the draft-block will run easily back and forth. Arms 25 and 26 extend outwardly and downwardly from the draft-block 23 one upon each side of the channel-bar 22, and grooved pulleys 27 and 28 are mounted between the lower ends of said arms. An attaching-plate 29 is secured to the channel-bar 13 and bearings 30 and 31 extend laterally from the attaching-plate. Groove-pulleys 32 and 33 and 34 are mounted between the bars 30 and 31. A rope or cable 35 is attached to the gate 16, extends upwardly to the guide-roller 36, then laterally around the guide-roller 37, then over the guide-roller 38, and downwardly to the counterweight 39, and the rope or cable 40 extends downwardly from the counterweight 39, under the pulley 34, around the pulley 27, around the pulley 33, around the pulley 28, around the pulley 32 to the spring 41, and said spring is connected to the latch 42. An attaching-plate 43 is secured to one corner of the gate 16 and upwardly-extending ratchet-teeth 44 are formed integral with the plate, said teeth being in position to be engaged by the tooth 45, carried by the latch 42, and a spring 46 holds the latch yieldingly in position to engage the teeth 44.

A lug 47 projects inwardly from the center of the draft-block 23. A roller 48 is placed endwise against the lug 47, and the cap-screw 49 is inserted through the roller and screwed into the lug to form a pintle for the roller, the head of the cap-screw being recessed into the roller.

The spacing-brackets 50 and 51 are attached to the post 11, and the means for operating the gates is attached to these brackets, said means comprising a straightway 52; the camway 53, communicating with the ends of the straightway; the upper switch 54, pivotally mounted in position to close the upper end of the straightway and open the end of the camway, and vice versa; the lower switch 55, pivotally mounted in position to close the lower end of the straightway and open the lower end of the camway, and vice versa; the crank 56 for operating the switch 54; the crank 57 for operating the switch 55; the lever 58, pivotally mounted; the rod 59, connecting one end of the lever 58 to the crank 56; the rod 60, connecting the crank 57 to the lever 58; the foot-lever 61, mounted upon the platform 14; the rope or cable 62, connected to the foot-lever under the platform, running over the guide-roller 63 and upwardly to the lever 58, and the springs 64 upon the pivots of the switches 54 and 55, the tensions of said springs being exerted to hold the switches in their normal positions.

The elevator may be provided with a gate 16 for each floor or landing. The counterweight 39 should partly balance the weight of the gate. The spring 41 is intended to provide elasticity for the operating rope or cable, and the spring 46 must be strong enough to hold the latch 42 in engagement with the teeth 44 when the gate 16 is down and resting upon the floor.

If the springs 64 are adjusted to hold the switches 54 and 55 in position to open the straightway and close the camway, then as the elevator-car passes up and down the roller 48 will pass through the straightway and the gates will not be opened. Then if the operator desires to open a gate he will press downwardly upon the foot-lever 61, thereby overcoming the tensions of the springs 64 and throwing the switches to close the straightway 52 and open the camway 53. Then as the elevator-car passes upwardly the roller 48 will pass into the camway, thereby moving the draft-block 23, laterally pulling upon the rope or cable 40, overcoming the tension of the spring 46, pulling the latch 42 out of engagement with the teeth 44, and pulling the gate 16 upwardly. The parts are so located that when the roller 48 is at the center of the camway the platform 14 will be on a level with the floor and the gate 16 will be at its highest limit. Then as the elevator-car passes downwardly or upwardly the gate will be closed and latched. In this way I produce an elevator that is half automatic with reference to the opening and closing of the gates. In other words, the gates are opened automatically at the will of the operator.

If it is desired that every gate should open and close automatically as the car passes up or down without operating the foot-lever 61, the springs 64 must be adjusted to hold the switches 54 and 55 normally in position to close the ends of the straightway and open the ends of the camway.

I claim—

1. In an elevator: the upper channel-bar 21 mounted horizontally; the lower channel-bar 22 mounted below and parallel with the upper channel-bar; the channels of said bars being toward each other; the draft-block 23 mounted between the channel-bars; the rollers 24 supporting the draft-block; said rollers fitting in the channels; the arms 25 and 26 extending outwardly and downwardly from the draft-block; one upon each side of the lower channel-bar; the pulleys 27 and 28 mounted between the lower ends of the arms; the pulleys 32, 33 and 34 secured to the frame; a cable running over said pulleys; a gate, an elevator-platform; and means for operating the draft-block as the platform passes up or down.

2. In an elevator: a draft-block mounted to move back and forth horizontally; a pair of pulleys carried by the draft-block; three pulleys attached to the frame; a gate; a cable attached to the gate and extending over said pulleys; and a spring connecting the end of said cable to the frame.

3. In an elevator: a gate; a rack upon the gate; a latch engaging the rack; a draft-block; pulleys secured to the frame; and a cable attached to the gate and extending over the pulleys and attached to the latch; and means for operating the draft-block.

4. In an elevator, a gate; a rack upon the gate; a latch engaging the rack; a draft-block; pulleys secured to the frame; and a cable attached to the gate and extending over the pulleys and attached to the latch; the straightway 52; the camway 53 communicating with the ends of the straightway; the upper switch 54 pivotally mounted in position to close the upper end of the straightway and open the upper end of the camway and vice versa; the lower switch 55 pivotally mounted in position to close the lower end of the straightway and open the lower end of the camway and vice versa; an elevator-platform; and means for operating the switches from the platform as the latter passes up or down.

5. In an elevator, a draft-block mounted to move back and forth horizontally; a pair of pulleys carried by the draft-block; three pulleys attached to the frame; a gate; a cable attached to the gate and extending over said pulleys; a spring connecting the end of said cable to the frame; the straightway 52; the camway 53 communicating with the ends of the straightway; the upper switch 54 pivotally mounted in position to close the upper end of the straightway and open the upper end of the camway and vice versa; the lower switch 55 pivotally mounted in position to close the lower end of the straightway and open the lower end of the camway; a connection between the switches so that they will operate simultaneously; an elevator-platform; a foot-lever upon the said platform; and a connection between the foot-lever and the switches whereby the operator may throw the switches.

In testimony whereof I have signed my name to this specification in presence of two subscribing witnesses.

JOHN J. SCHWOB.

Witnesses:
 ALFRED A. EICKS,
 M. D. SCHULZE.